United States Patent [19]

Roberts

[11] Patent Number: 4,540,035
[45] Date of Patent: Sep. 10, 1985

[54] TIRE REPAIR PATCH

[76] Inventor: Simon Roberts, Southfield, Mich.

[21] Appl. No.: 594,174

[22] Filed: Mar. 28, 1984

[51] Int. Cl.³ .............................................. B60C 21/02
[52] U.S. Cl. ..................................... 152/367; 138/98; 152/450; 152/345.1; 156/97; 428/66; 428/314.4
[58] Field of Search ............... 152/367, 370, 430, 157, 152/158, 354 R, 356 R, 330 R, 359; 156/95, 97; 128/155, 156; 428/66, 314.4; 138/97, 98

[56] References Cited

U.S. PATENT DOCUMENTS

| | | | |
|---|---|---|---|
| 1,956,695 | 5/1934 | Reinitz | 128/155 |
| 3,304,938 | 2/1967 | Perkins, Jr. | 128/156 |
| 3,306,563 | 2/1967 | Soto | 156/97 X |
| 3,425,412 | 2/1969 | Pope | 128/156 |
| 3,468,359 | 9/1969 | Rutledge | 152/367 |

Primary Examiner—Edward Kimlin
Assistant Examiner—Thomas Bokan
Attorney, Agent, or Firm—Alex Rhodes

[57] ABSTRACT

An improved tire patch is disclosed herein for use either singularly or jointly with a tire repair plug for sealing a puncture of a vehicle tire. The improved repair patch includes a thick seal portion made of a soft resilient air impervious closed cell elastomer fully encased in a thin outer covering of the same material. The seal portion has parallel upper and lower faces and an aperture in the center portion thereof. A thin cover portion is bonded to the upper face of the thick portion and subtends the aperture thereof. The repair patch, when adhesively applied to the inner surface of a punctured tire with the aperture thereof positioned directly opposite the puncture, improves the durability of the repair, allows the joint use of a tire repair plug and avoids exposure of the repair patch to damage from the ends of broken steel reinforcing wires of steel belted radial ply tires.

8 Claims, 11 Drawing Figures

TIRE REPAIR PATCH

BACKGROUND OF THE INVENTION

The present invention relates to tire repair patches and more particularly to an improved tire repair patch for use either singularly or jointly with a tire repair plug for sealing a puncture of a vehicle tire.

Current tire repair patches are of two types, viz., small flexible patches of thin sheet rubber-like materials and larger stiffer patches, commonly referred to as boots, which taper from thick center portions to thin outer portions. In the current practice a puncture is sealed by adhesively bonding one surface of a repair patch to the inner surface of the tire without providing clearance between the patch and tire surface adjacent to the puncture.

Heretofore, repairs with tire patches have lacked the requisite durability and reliability for the severe service conditions tire repairs are commonly subjected to. Additionally, the high weight of the large fiber reinforced patch has caused tire imbalance and thumping noises in tires repaired therewith.

During constant speed driving, a rolling tire is deformed during each revolution thereof as it passes through the tire-to-road contact zone and further deforms during vehicle acceleration, braking, cornering and road impact.

By way of illustration of the severe service a repair patch is subjected to, approximately eight hundred thousand tire revolutions can occur during each one thousand miles of vehicle driving and a corresponding number of stress cycles will occur in a repair patch which is adhesively bonded to the tire. Heretofore, it has not been uncommon for tire repair patches to fail after several thousand miles of driving.

One factor contributing to the failure of repair patches is the current practice of bonding a patch to the portion of the tire adjacent to a puncture. As a result of this practice, patch stresses close to the puncture are substantially higher than patch stresses farther from the puncture because tire deflections in the vicinity of the puncture, and hence the portion of the patch bonded thereto, are greater than the undamaged portion of the tire farther from the puncture and portion of the patch bonded thereto.

Another contributing factor is that the compression of air within the tire and hysteresis losses of the tire produce large quantities of heat which are transferred to the patch, thereby raising the temperature of said patch with a consequent deleterious effect on the patch material.

Another contributing factor is the lack of clearance between the puncture and the patch adjacent to the puncture which exposes the patch to damage by the ends of broken steel reinforcing wires of radial ply tires.

SUMMARY OF THE INVENTION

The improved tire patch has a thick compliant sealing portion with an aperture in the center portion thereof and a cover portion sealingly attached to said thick compliant portion and subtending said apertured center portion.

The thick compliant sealing portion being one feature of the invention is made of an air impervious resilient closed cell rubber-like material. When used for sealing a puncture of a tire, the thick sealing portion is adhesively bonded to the inner surface of a tire with the apertured center portion thereof directly opposite said puncture so that a clearance space is provided between the tire patch and the puncture.

It is a primary object of the present invention to reduce the level of stress in a tire repair patch.

Another object, in addition to the foregoing object, is to prevent damage to a tire repair patch by the ends of broken steel reinforcing wires of radial ply tires.

Another object, in addition to the foregoing objects, is to eliminate imbalance and objectionable noise in tires having tire repair patches.

Another object, in addition to the foregoing objects, is to reduce the operating temperature of a tire repair patch.

The foregoing features and objects, along with additional features, objects and advantages of the invention become more apparent in the ensuing description and accompanying drawings which disclose the invention in detail. A preferred embodiment is disclosed in accordance with the best mode contemplated in practicing the invention and the subject matter in which exclusive property rights are claimed as set forth in each of the numbered claims at the conclusion of the description.

DESCRIPTION OF THE PREFERRED EMBODIMENT

Figure 1:
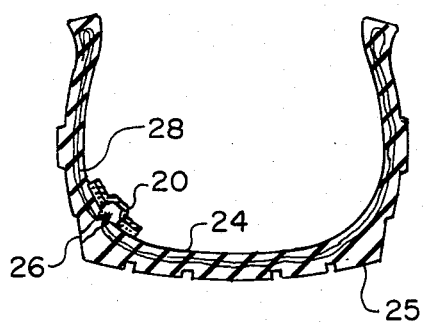
FIG. 1 is a radial cross-sectional view through a typical tire showing the improved tire repair patch in sealing relationship with a puncture through the side wall of the tire.
Figure 2:
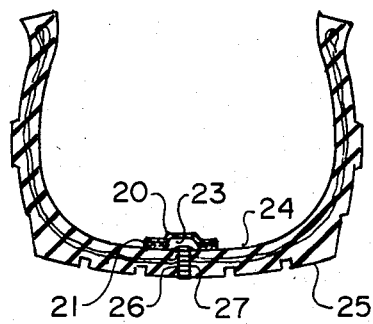
FIG. 2 is a radial cross-sectional view through a typical tire showing the improved tire repair patch and a repair plug in joint sealing relationship with a puncture through the tread portion of the tire.

Referring now to the drawings wherein like reference characters refer to like and corresponding parts throughout the several views, the particular embodiment of the improved tire patch 20 disclosed for illustrative purposes in FIGS. 1 through 4, inclusive, includes a thick resilient centrally apertured seal portion 21 and a cover portion 22 subtending the aperture 23 thereof in sealing relationship to the thick seal portion 21.

The tire repair patch 20 is applied to the inner surface 24 of a tire 25 by positioning the aperture 23 of the seal portion 21 directly opposite a puncture 26, as shown in FIG. 1, and adhesively bonding one surface of said seal portion 21 to the inner tire surface 24. It will be observed in FIG. 2 that the clearance space provided by the circular aperture 23 of the seal portion 21 permits the joint use of the repair patch 20 with a tire repair plug 27 for sealing the puncture 26. Further, that the central aperture 23 avoids exposure of the patch 20 to damage from the ends of broken tire steel reinforcing wires 28 and reduces heat conduction from the tire 25 to the patch 20.

The apertured thick seal portion 21, being of generally circular shape with flat parallel annular upper 30 and lower 31 faces, is made of a soft resilient air impervious closed cell elastomeric material and is preferably totally encased in a thin covering 32 of the same elastomeric material. The annular lower faces 31 of the seal portion reduces stress in the repair patch 20 by eliminating the heretofore adhesive bond adjacent to the puncture 26.

A thin covering 32 preferably projects outwardly around the lower outer portion of the thick seal portion 21 to form a thin peripheral sealing lip 33 with converging upper 34 and lower 35 faces. The sealing lip 33 preferably angles slightly downwardly such that when the thick seal portion 21 is adhesively bonded to the inner tire surface 24 the sealing lip 33 deflects and conforms to said inner tire surface 24.

Figure 5:
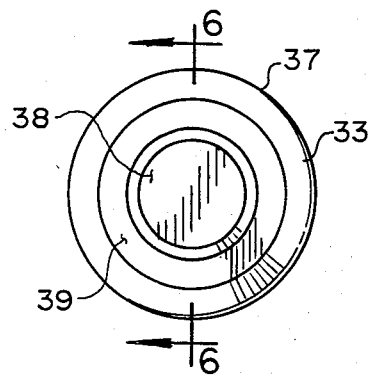
FIG. 5 is a plan view of another embodiment of the improved tire repair patch.
Figure 6:
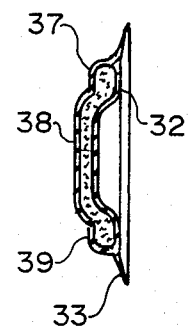
FIG. 6 is a cross-sectional view taken along the line 6—6 of FIG. 5.

The cover portion 22, suitably bonded to the upper face 30 of the thick seal portion 21, is preferably made of a resilient air impervious material. The cover portion 22 has a raised dome center portion 36 in concentric relationship to said aperture 23. As shown in the particular unitary embodiment 37 disclosed in FIGS. 5 and 6, the top cover portion 38 may be molded integrally with and of the same material as the thick seal portion 39.

Figure 7:
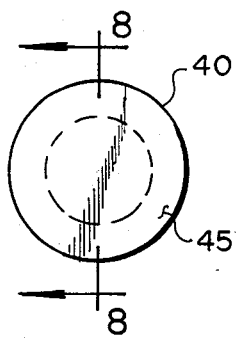
FIG. 7 is a plan view of still another embodiment of the improved tire repair patch.
Figure 8:
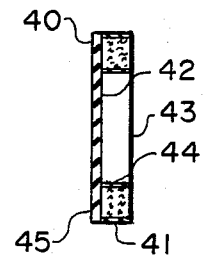
FIG. 8 is a cross-sectional view taken along the line 8—8 of FIG. 7.

Referring now to FIGS. 7 and 8, an embodiment 40 is disclosed therein comprising a circular thick seal portion 41 with flat parallel upper 42 and lower 43 faces having an aperture 44 in the center thereof and a flat circular cover portion 45 subtending said aperture 44 and suitably bonded to the upper face 42 of the thick seal portion 41, whereof said thick seal portion 41 may be conveniently cut from a soft resilient air impervious closed cell elastomeric sheet or tube and said cover portion 45 may be conveniently cut from a resilient or rigid sheet of air impervious material.

Figure 3:
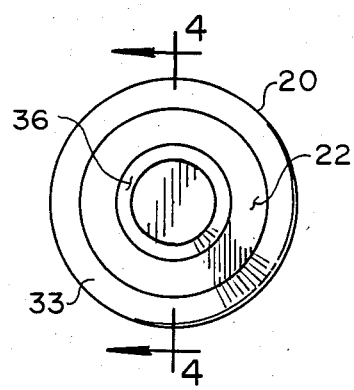
FIG. 3 is a plan view of one embodiment of the improved tire repair patch.
Figure 4:
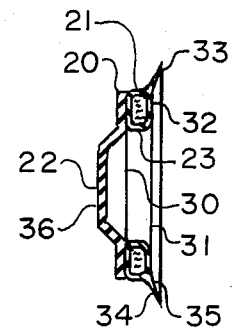
FIG. 4 is a cross-sectional view taken along the line 4—4 of FIG. 3.
Figure 9:
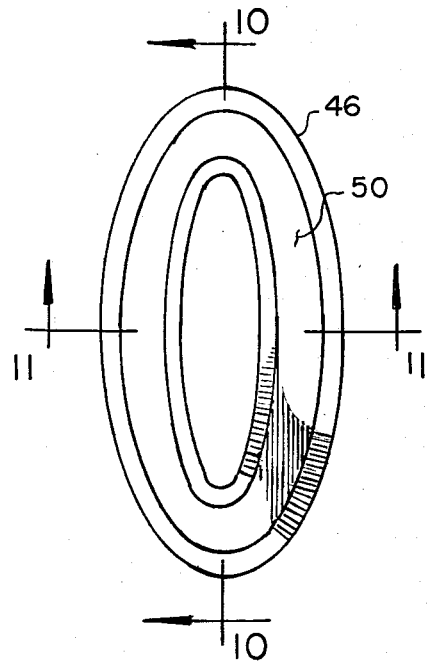
FIG. 9 is a plan view of a modified form of the embodiment of the tire repair patch shown in FIG. 3, particularly adapted for sealing large size punctures.
Figure 10:
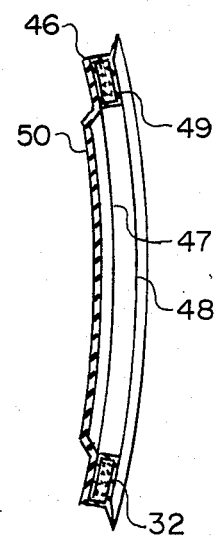
FIG. 10 is a cross-sectional view taken along the line 10—10 of FIG. 9.
Figure 11:
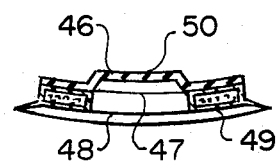
FIG. 11 is a cross-sectional view taken along the line 11—11 of FIG. 9.

The embodiment 46 disclosed in FIGS. 9 and 10, particularly suitable for large size repairs, is of the same construction as the embodiment of FIGS. 3 and 4, described herein, except for the generally elliptical shape and arcuate upper 47 and lower 48 faces of the thick seal 49 and conforming cover 50 portions thereof.

Although but several embodiments of the invention have been disclosed and described in detail, it is obvious that many changes may be made in the size, shape, arrangement and detail of the various elements of the invention, all without departing from the spirit and scope thereof, as defined by the appended claims.

I claim:
1. A patch for repairing and sealing a punctured vehicle tire comprising:
    (a) a thick highly compliant annular sealing portion made from a soft rresilient air impervious closed cell elastomeric material, said annular sealing portion having parallel upper and lower annular faces, the lower of said faces being adapted to adhesively bond the annular sealing portion to the inner surface of a tire; and
    (b) a thick cover portion adjoining the upper face of the annular sealing portion, said cover portion subtending a center aperture of the annular sealing portion and made integral with said annular sealing portion.

2. The tire patch recited in claim 1 wherein said lower face which is adapted for sealing said ring to a tire is convex to conform to the shape of the inner surface of said tire.

3. The tire patch recited in claim 1 further comprising a thin outer elastomeric layer encasing said closed cell elastomeric annular sealing ring and cover portions.

4. The tire patch recited in claim 1 further comprising a thin flexible auxiliary sealing ring projecting outwardly and downwardly from the lower portion of the periphery of said thick ring portion.

5. A patch for repairing and sealing a punctured tire comprising:
    (a) a thick highly compliant annular sealing ring made from a soft resilient air impervious closed cell elastomeric material, said annular sealing ring having parallel upper and lower annular faces, the lower of said faces being adapted to adhesively bond said face to the inner surface of a tire; and
    (b) a thin air impervious cover attached to the upper face of the sealing ring, said cover subtending the center aperture of the annular sealing ring.

6. The tire patch recited in claim 5 wherein said cover is made from a thin sheet of resilient material.

7. The tire patch recited in claim 5 wherein said cover is made from a thin sheet of rigid material.

8. A tire patch for repairing and sealing a punctured vehicle tire comprising:
    (a) a thick highly compliant annular sealing ring made from a soft resilient air impervious closed cell elastomeric material, said annular sealing ring having parallel upper and lower faces;
    (b) a thin outer layer of elastomeric material completely encasing said closed cell ring; and
    (c) a thin air impervious cover adjoining the upper face of the outer annular sealing ring, said cover subtending a center aperture of the annular sealing ring.

* * * * *